June 9, 1953 M. M. LEVY 2,641,740

ELECTRICAL PULSE CODE SIGNALING SYSTEM

Filed Dec. 21, 1950 2 Sheets-Sheet 1

INVENTOR
Maurice Moise Levy
BY
Elgin Spankelton [signature]
ATTORNEY

June 9, 1953 M. M. LEVY 2,641,740

ELECTRICAL PULSE CODE SIGNALING SYSTEM

Filed Dec. 21, 1950 2 Sheets-Sheet 2

INVENTOR
MAURICE MOISE LEVY
BY
ATTORNEY

Patented June 9, 1953

2,641,740

UNITED STATES PATENT OFFICE 2,641,740

ELECTRICAL PULSE CODE SIGNALING SYSTEM

Maurice Moïse Levy, London, England, assignor to The General Electric Company Limited, London, England Application December 21, 1950, Serial No. 201,928
In Great Britain December 23, 1949

13 Claims. (Cl. 332—11)

This invention relates to electrical signalling systems of the kinds using pulse code modulation.

In a system employing pulse code modulation the various channels of intelligence to be transmitted, are sampled on a time-division basis. Each sample is then represented by a quantized amplitude or integer number representative of the characteristic of the sample. By "quantized amplitude" is meant an amplitude which is an integral multiple of a standard amplitude. The integer number in turn is converted into a code for transmission over a communication channel. The codes corresponding to the various incoming intelligence channels are then transmitted in multiplex, for example, by a time-division multiplex system.

At the receiving end, the codes are decoded and distributed to the relevant channels to reconstitute the original intelligence on the channels.

Preferably the quantized amplitude and integer number is represented by a binary number, since this can be represented by simple "on-off" pulses. If then there are "N" coding pulses associated with each channel, the pulse positions being equally spaced and the pulses of like amplitude, width and waveform, then the number of quantized amplitude or integer numbers including zero that can be transmitted is equal to $2^N$. If the code pulse positions of one channel are numbered sequentially, then the zero quantized or amplitude number may be represented by the absence of all pulses, a first value by a pulse appearing in the first position, a second value by a pulse appearing in the second position and so on. Consequently all quantized or integer numbers from 0 to $2^N$ can be represented by different combinations of the "N" pulses in the code group.

It will be appreciated that the nature of the intelligence to be transmitted is then represented by the appearance or absence of pulses in the code pulse group. At the receiving end, therefore, the intelligence can be reconstituted so long as a pulse appears in the correct group position but, within limits, the pulses need not be a replica in amplitude, width or shape of the original transmitted pulse. The effects of any interference on the communication channel, which may be a radio channel, is therefore not to any great extent reproduced in the reconstituted intelligence.

The correspondence of the reconstituted intelligence with the original intelligence will, however, be determined by the degree of original quantization since the original amplitude cannot be represented with an accuracy greater than one quantum. The degree of quantization is, of course, itself determined by the accuracy of reconstitution required for the overall system.

In order to obtain the quantized amplitude or integer number from each sample on transmission or to reconstitute each sample from the quantized amplitude or integer number on reception, it has previously been proposed to perform a successive subtraction operation, that is to say an operation in which each subtraction after the first is performed from the residue from the previous subtraction, in which the amplitude of the sample is compared in turn with a sequence of test amplitudes in descending order of magnitude, each of which is a predetermined fraction of the preceding one. For a binary code system the function is, of course, one half and for a five digit binary code which enables $2^5=32$ amplitudes to be coded, the test amplitudes are respectively of magnitude 16, 8, 4, 2 and 1.

With such a system the possibility of error in coding increases with the diminishing magnitude of the test amplitude and, for example, it will be realised in the five digit binary code the possibility of error with the "unit" test amplitude is, in effect, much greater than the possibility of error with the "sixteen" test amplitude.

The object of the present invention, is to provide an electrical pulse code modulation system having an improved accuracy of coding.

According to the present invention, apparatus for producing an electrical pulse code modulation signal in which the coded pulses are representative of a characteristic of a signal which is to be transmitted comprises means for periodically sampling the said signal, coding means for producing a first impulse code train which represents the said characteristic to a first degree of accuracy, means to amplify the error signal corresponding to the difference in the characteristic of the original signal and the characteristic represented by the said first impulse code train and coding means for producing a second impulse code train representative of said amplified error signal, the duration of the first and second impulse code trains being equal to or less than the time between successive samples to be coded.

The characteristic of the signal which is to be coded may be an amplitude or a frequency or a time or similar displacement.

In preferred apparatus in accordance with the invention, the means for producing the second code train is of the same general nature as the means for producing the first impulse code train and may in fact be the same means.

Alternatively, the means producing the second code train is not of the same general nature as the means producing the first impulse code train.

In one embodiment of the invention, apparatus for generating a pulse code signal representative of a voltage level differing by S from a datum level, comprises means for repeatedly generating a pulse cycle comprising a first train of pulses of progressively decreasing amplitude followed at least by a second similar train of pulses of progressively decreasing amplitude, the ratio of the amplitude of each pulse in each train to the amplitude of the next preceding pulse in the same train being substantially constant and the length of each train being at most one half of the time between successive samples to be coded, means for subtracting the peak voltages of successive pulses in said first train from a succession of voltage values to produce resultant voltages respectively, the first of said voltage values being S and each of the remaining voltage values being that obtained in the nearest preceding subtraction in which the resultant voltage is of the same sign as S with respect to the datum level and in which a resultant voltage $S^1$ remains after subtraction of the voltage corresponding to the final pulse of the train and means for subtracting the peak voltages of successive pulses in said second train from a succession of voltage values to produce resultant voltages respectively, the first of said voltage values being $NS^1$, where N is a positive integer, and each of the remaining voltage values being that obtained in the nearest preceding subtraction in which the resultant voltage is of the same sign as $NS^1$ with respect to the datum level and means for generating pulse signal elements which correspond one to each of the pulses in each pulse cycle and distinguish between those pulses in the pulse cycle which gave rise to resultant voltages of the same sign as S and to $NS^1$ with respect to the datum level and those which gave rise to resultant voltages of the opposite sign.

In this last mentioned arrangement, the means for producing the trains of pulses of progressively decreasing amplitude comprises a periodically shock-excited tuned circuit suitably damped to provide successive pulses of the desired amplitude ratio and a pulse train of the desired length.

The arrangement may then be such that when the resultant voltage reaches the specified value $S^1$ subsequent voltage peaks of the first train of pulses are themselves multiplied by N to form the second train and these are successively subtracted from the multiplied resultant voltage $NS^1$.

Alternatively, when the resultant voltage has reached the specified value $S^1$ the second train is constituted by a new train of damped pulses, then initiated which is successively subtracted from $NS^1$, the amplitude of the initial pulse of the new train then being equal to the amplitude of a selected pulse, for example the first of the associated first train of pulses.

In another embodiment in accordance with the invention, apparatus for generating coded pulses representative of a voltage level differing by S from a datum level comprises an integrating circuit fed by periodic pulses and producing a stepped waveform, a level comparator means for comparing the stepped waveform with the voltage level S, means for interrupting the periodic pulses to the integrator when the level of the stepped waveform exceeds the voltage level S, means for coding the step voltage attained, means for amplifying the difference between the step voltage and the level S and means for coding the amplified difference voltage.

One arrangement in accordance with the invention will now be described by way of example, with reference to the accompanying diagrammatic drawings of which:

Figure 2:
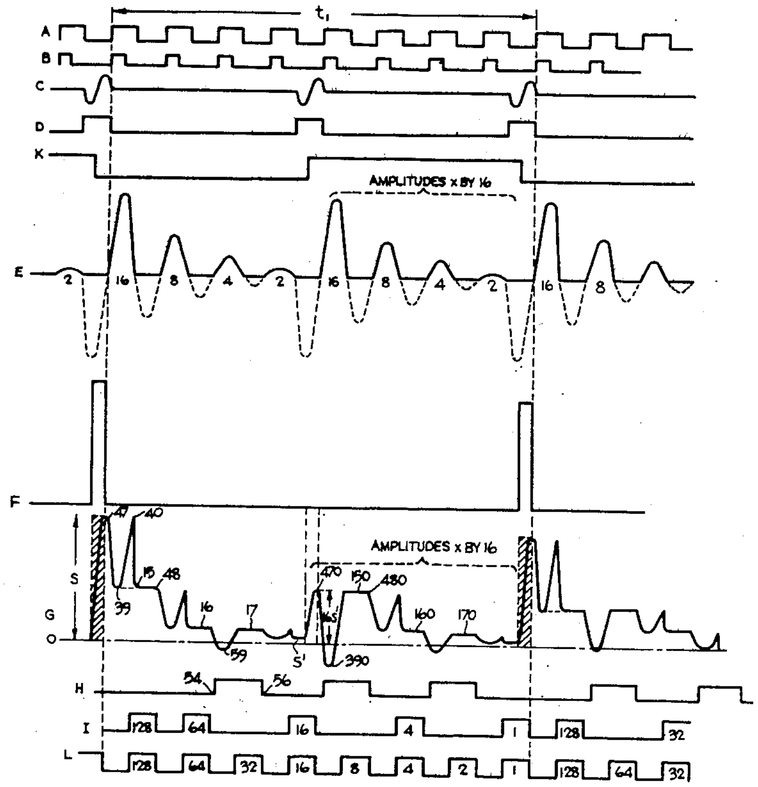
Figure 3:
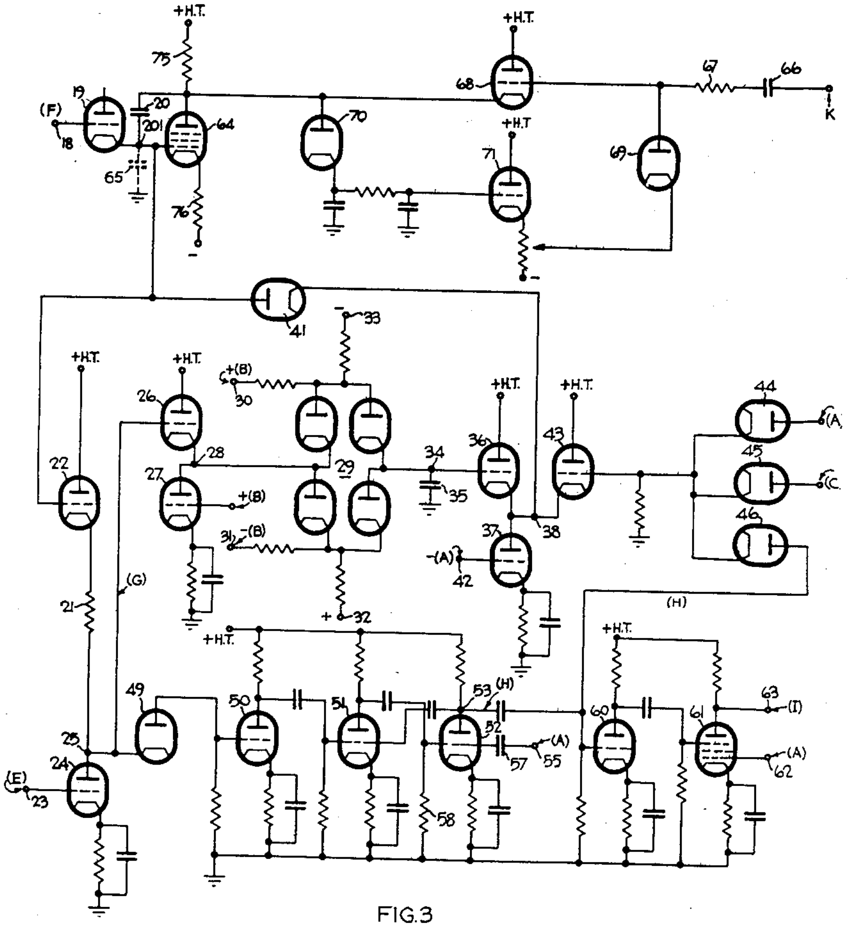
Figure 3 is a circuit diagram of apparatus for generating the pulse code signal.

Figure 2 contains waveforms marked A to L which are employed in the arrangement of Figure 3 and the points in Figure 3 at which these waveforms occur are indicated by the same letters A to L respectively.

Figure 1:
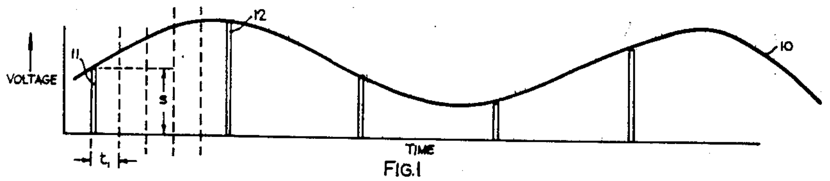
Figures 1 and 2 are explanatory form diagrams.

Referring to Figure 1, it is assumed that it is required to send coded pulses representative of the amplitude of a signal 10. This signal 10 is treated in known manner to produce sample pulses 11, 12, etc. whose amplitude represents the amplitude of the waveform 10 at predetermined regularly recurrent instants. The system to be described is a multi-channel system in which five channels are to be transmitted in time-division multiplex and sample pulses in respect of the five channels are fed in turn to the apparatus for generating the pulse code signal. In order that the pulses of various channels may interlace with one another, it is arranged, as hereinafter described, so that each interval containing the code pulse group defining one of the pulses 11, 12, etc. has a duration which is one-fifth of the recurrence period of sample pulses of one channel, thus leaving time intervals which are occupied by code pulse groups of the four other channels.

The sampling circuit may comprise a plurality of pentode thermionic valves having a common anode resistance, these valves being allocated one to each channel included in the final multiplex signal. Considering now one of these valves, the cathode is connected to earth through a bias resistance which is shunted by a condenser and a further resistance is connected between the suppressor grid and the cathode. The appropriate channel signal is continuously fed to the control grid of this valve through a transformer and a gating signal is supplied through a condenser to the suppressor grid. The gating signal consists of positive-going pulses which occur at the channel recurrence frequency of the system and the arrangement is such that the valve to which it is applied is only conducting during the period of the pulses and it will be appreciated that when it is conducting, the voltage across the said common anode resistance is a measure of the amplitude level on the associated channel at that instance. The gating signals applied to the several valves are staggered in time so that only one of these valves is conducting at a time and the required signal for coding is produced across the common anode resistance. The gating signals may be supplied from tapping points spaced along a delay line to one end of which is fed a signal having positive-going pulses which occur at the correct frequency, for example having the waveform D in Figure 2.

The times $t_1$ between successive sample pulses 11, 12, etc. of the five channels are available for the transmission of coded pulses representative of the instantaneous amplitudes of those pulses. In the arrangement shown the code pulse group comprises eight pulse positions thus providing $2^8=256$ codes for transmission of different amplitude levels.

Referring to Figure 2, the curve A is a rectangular waveform oscillation having a period equal to the period of the coded pulses to be transmitted. The period $t_1$ in Figure 2 corresponds to the period with the same reference in Figure 1. Since, as already stated, eight coded pulses are to be produced in each recurrent group, the period $t_1$ includes eight periods of the wave shown at A. The waveform at A may be produced in known manner by means of an oscillation generator and suitable clipping and squaring circuits.

The waveform B is of the same frequency as that at A but the positive-going portions of the cycle are of smaller duration. This oscillation may be produced in the same manner as the oscillation at A, the clipping being, however, carried out at a higher amplitude level.

The waveform at C consists of what may be called pulses having a recurrence period which is four times that of the waveforms A and B and is therefore equal to half the period of each group of coded pulses.

The waveform at E is produced by applying the pulses at D to shock-excite a tuned circuit having a natural frequency equal to that of the waveforms A and B. The damping of this tuned circuit is arranged to be such that the amplitude of each positive peak is one-half of that of the preceding positive peak. The waveform at E is obtained by amplitude-limiting the waveform from the shock-excited tuned circuit to retain only the positive-going portions. The relative amplitudes of the peaks in the curve E are indicated by the numerals 16, 8, etc.

The circuit for providing a signal having the waveform E may comprise a thermionic valve having a resistance in its anode circuit. A signal having the waveform D is fed to the control grid of this valve, which is arranged to operate as an amplifier, and a coupling condenser is connected between one side of a parallel-connected inductance and capacity and the anode of this valve, the other side of the parallel tuned circuit being earthed. The amplified pulse signal is thereby caused perodically to excite the tuned circuit. A diode valve is provided with its anode connected to the junction of said coupling condenser and the tuned circuit and its cathode through a further resistance to earth. This diode valve is only conducting during the positive half cycles of the damped oscillatory waveform which is produced across the tuned circuit so that a signal having the waveform E is developed across the further resistance in the cathode circuit of the diode valve. The required signal may be passed through a cathode follower stage before being utilised as hereinafter described. Similarly the waveform at C is produced by shock-exciting a tuned circuit with the waveform D and gating the damped oscillations generated therein to select only the first complete cycle of oscillation.

The curve G is obtained by subtracting successive peaks of the waveform E from the instaneous amplitude S to be transmitted in such a manner that whenever the resultant voltage obtained by such subtraction is positive relatively to the datum level marked 0, this resultant voltage is retained and the next peak of the waveform E is subtracted from it. Whenever the resultant voltage is negative, however, the resultant voltage preceding the subtraction which renders the resultant voltage negative is retained. Thus the effect of subtracting the first peak of amplitude 16 from the amplitude S is to produce an amplitude 15 which is the resultant voltage of the subtraction. Since this resultant voltage is positive relative to the datum line, this resultant voltage is retained and from it is subtracted the next peak of amplitude 8. Here again, in the example, the resultant voltage is positive as indicated at 16 in curve G and from this is subtracted the third peak of amplitude 4, which, as will be seen, renders the resultant voltage negative. Because of this, instead of retaining this new and negative resultant voltage, the previous resultant voltage, namely the level 16, is retained at 17 and so on. After the subtraction of the fourth pulse, the resultant voltage $S^1$ is multiplied by sixteen and the amplified remainder subjected to a repetition of the coding operations already described.

The waveform H contains pulses whose leading edges occur whenever the waveform G crosses the datum 0 from positive to negative, the trailing edges of these pulses occurring at fixed times a little less than one period of the waveform A later.

The waveform I is the desired pulse code signal and it is derived by gating the pulses A by means of the pulses H, the pulses A being allowed to pass through the gate whenever the waveform H is negative.

The waveform L is included to show the transmission of a pulse in each position corresponding to the transmission of a coded amplitude 255.

Referring now to Figure 3, the waveform F is applied at a terminal 18 to the control grid of a valve 19, having its cathode connected to the control grid of a pentode valve 64 which is arranged to act as an integrator with a condenser 20 connected between its control grid and anode. In this way the condenser 20 receives a charge and assuming that initially it was uncharged the voltage across the virtual condenser 65 which has the same effect as the condenser 20 is made equal to S. A like voltage is developed across the resistor 21 in the cathode circuit of a valve 22. The waveform E is applied to a terminal 23 and thus to the control grid of a valve 24. It will be seen that the voltage at the point 25 will be the difference between the voltage at the point 201 and the voltage applied in the terminal 23 multiplied by the amplification factor of the valve, the latter voltage being reversed in sign by the valve 24.

Consideration will first be given to conditions existing when there is applied to the terminal 23 the first peak of the curve E. During the time under consideration the waveform G between points 47 and 49, which is the difference referred to above, is applied to the control grid of a valve 26 having a valve 27 in its cathode circuit. It will be assumed initially for simplicity that the valve 27 operates as a simple impedance. The voltage at the point 28 therefore substantially follows that at the point 25 and the former voltage is applied through a clamping circuit 29, including four diodes connected as shown. The waveform B is applied to a terminal 30 and the same waveform reversed in sign, represented by −B is applied to a terminal 31. A terminal 32 has applied thereto a suitable positive bias and a terminal 33 has applied thereto a suitable negative bias. This clamping circuit 29 is of well known type and is such that in the absence of pulses at terminals 30 and 31 there is a high impedance between terminals 28 and 34. When however the pulses B and −B are applied to terminals 30 and 31 respectively, the point 34 assumes the instantaneous potential of the point 28, thus charging a condenser 35 correspondingly. The condenser 35 is thus charged to a voltage corresponding to the point 39 in curve G since each pulse of the waveform B which opens the clamping circuit 29 is arranged to end substantially at the minimum of the waveform G.

As shown the waveform B is applied also to the control grid of the valve 27, and the effect of this is that during the pulses B the valve 27 has a very low impedance and consequently a large current can flow therethrough. The effect of this application of the waveform B to the valve 27 is thus to increase the rate at which the condenser 35 receives or loses charge.

As the voltage represented by the waveform G increases from point 39 to point 40, the potential at the point 28 increases correspondingly, but this has no effect upon the charge on the condenser 35 since the clamping circuit 29 is then insulating. The voltage at the point 34 is applied to the control grid of a valve 36 having in its cathode circuit a further valve 37 which may, in the first place, be regarded as a constant impedance. A voltage substantially equal to that at point 34 is therefore produced at point 38.

Between the point 38 and the cathode of the valve 19 is connected a diode 41. Under the conditions which are being considered, the potential at the point 38 will correspond to that of point 39 in curve G while the potential at the cathode of the valve 19 and hence at the anode of the diode 41 will be at the potential S. Consequently the diode 41 will conduct and the cathode of the valve 19 will assume the potential of point 38, namely that of point 39 in curve G. As shown in the drawings, a waveform which is the same as that of A but reversed in sign, labelled —A is applied to a terminal 42 and hence to the control grid of the valve 37. The result is to make the valve 37 highly conducting during the half-cycle at the frequency of the waveform A immediately following the point 40 in curve G and this has the effect of hastening the change of charge of the condenser 20 and hence the assumption by the cathode of the valve 19 of the desired potential.

In describing the potential at the point 38, no account has so far been taken of the circuits connected to the point 38 to the right thereof in the drawing. Thus the point 38 is connected to the cathode of a valve 43, the control grid of this valve being connected to the cathode of three diodes 44, 45 and 46. If, owing to a positive potential at the anode of any one of these diodes, the control grid of the valve 43 is driven positive, it is arranged that the point 38 is driven so positive that the diode 41 is prevented from conducting. To the anode of the diode 44 is applied the waveform A and it will be seen from curves A and G that the effect of this diode is to prevent conduction of the diode 41 during the interval between the points 47 and 40 in curve G whilst the waveform A is positive. However, conduction of the diode 41 is permitted during the interval between points 40 and 48 when the waveform A is negative. Thus, in spite of the action of the diode 44, the cathode of the valve 19 assumes the potential of the point 38, as described, through conduction of the diode 41 during the interval between points 40 and 48, the potential of the terminal 18 having fallen to zero by that time, so that the cathode of the valve 19 assumes the level 15 in curve G.

During the period whilst the second peak of the curve E is operative upon the terminal 23, the behaviour of the circuit described is the same as that already described for the first peak, and after the second peak has ceased the cathode of the valve 19 assumes the potential 16 in curve G.

The point 25 is connected to the cathode of a diode 49 the anode of which is connected to the control grid of valve 50, this control grid being normally held at earth potential. Whenever the point 25 falls below earth potential, which in this example is the datum potential, the diode 49 will conduct. It will be seen from waveform G that this occurs at the point 59 during the third peak of the waveform E. The effect of such conduction of the diode 49 is that the grid of the valve 50 is driven negatively, causing a positive pulse to appear at the anode of the valve 50. This positive pulse is applied to a multivibrator comprising two valves 51 and 52, which are so biassed that normally the valve 51 is cut off and the valve 52 is conducting. When the positive pulse arrives on the grid of the valve 51, this valve is caused to conduct and the multivibrator triggers, producing at the point 53 the leading edge 54 of the waveform H. Owing to a suitably long time constant this condition is arranged to be maintained until a positive pulse is applied to terminal 55 to render the valve 52 once more conducting and generate the trailing edge 56 of the waveform H at the point 53. In order to generate this positive pulse, the waveform A is applied to terminal 55. It will be noted that the leading edge 54 in curve H occurs slightly after a positive-going leading edge of curve A. The next following negative-going trailing edge of curve A produces a negative pulse at the terminal 55 which has no effect on the multivibrator, and it is the next succeeding positive-going edge of the waveform A that is used to reset the multivibrator. The condenser 57 and leak resistor 58 serve to differentiate this positive-going edge and produce a sharp positive pulse at the terminal 55 which rests the multivibrator.

After being reset, the next positive-going edge of the waveform A occurs whilst the multivibrator is still in that condition and therefore has no effect. In fact so long as the waveform G on the terminal 25 remains positive, the diode 49 is non-conducting and the valve 50 and multivibrator 51, 52 do not operate. The signal having the waveform H generated at the point 53 is applied to the anode of the diode 46 and ensures that throughout the duration of a positive-going pulse in the waveform H the diode 41 cannot conduct, and hence the voltage at the cathode of the valve 19 cannot change. It is for this reason that after the negative excursion of the curve G through the point 59 the voltage level is as shown at 17, which is the same as that at 16.

The voltage of waveform H is also applied through a valve 60 to the suppressor grid of a valve 61, the valve 60 serving merely to invert the phase of the waveform H. The waveform —A that is the waveform A in reversed phase, is applied to terminal 62 and thus to the control grid of the valve 61. The pulses applied to the suppressor grid of the valve 61 serve to gate this valve and allow the pulses applied to the terminal 62 to produce an output at a terminal 63 only whilst the suppressor grid is positive and to prevent the pulses at terminal 62 from having any effect at the terminal 63 throughout the duration of negative pulses upon the suppressor grid, that is between such points as 54 and 56 in curve H. The waveform at terminal 63 is therefore as shown at I and is the first part of the pulse code representation of the curve F.

It will now be appreciated that whilst with the initial subtractions from the amplitude S that is to be coded, both the initial shock pulses and the resultants were relatively large, after the point 16 all these values have become much smaller. Consequently there is an increased possibility of false coding. After the pulse of order four therefore (that is the fourth pulse in the train), the resultant of the successive subtractions is multiplied sixteen times in amplitude as shown at the point 470. Successive peaks of the pulses in the next train of the waveform E are then subtracted from this amplified remainder and the subtraction of the first such pulse depresses the waveform G below the datum line and consequently no code pulse is initiated in the manner previously described. This next train of four pulses of the waveform E may be considered as the fifth to eighth pulses of the first train multiplied by the same factor, namely sixteen, as the said remainder.

The actual multiplication of the remainder is achieved by the circuit including the valve 64 and the condenser 20. The waveform K is applied through a condenser 66 and the resistance 67 to the grid of a valve 68, the cathode of which is connected to the anode of the valve 64. The resistance 75 in the anode circuit of the integrator valve 64 has a value fifteen times that of the resistance 76 in the cathode circuit of the same valve, and the arrangement is such that when the grid of the valve 64 is at earth potential and the grid of the valve 68 is driven relatively negative by the signal having the waveform K, the anode voltage of the valve 64 has the same value as when positive portions of the waveform K are applied to the grid of the valve 68. Consequently, when there is a voltage on the point 201 with respect to earth, a change in the anode voltage of V causes a corresponding change of 16V in the cathode voltage.

After the fourth pulse of the waveform E the anode voltage of the valve 64 is a measure of the level $S^1$. Initially the valve 68 is non-conducting but the grid thereof is driven positive by the application of the waveform K shortly after the fourth pulse of the waveform E. The voltage on the anode of the valve 64 is thereby clamped to a predetermined value and the voltage at the point 201 correspondingly follows. There is thus a voltage of $16S^1$ at the point 201.

The circuit including the diodes 69 and 70 and the triode 71 serves to limit the voltage lift of the anode of the valve 64. It will be appreciated that, when conducting, the voltage on the cathode of the valve 68 follows that on the grid thereof. The valve 70 however acts as a peak valve voltmeter and, through the valve 71 and the diode 69, it is arranged that, neglecting for the moment the drop across the valve 68 when it is conducting, the voltage on the grid of the valve 68 is clamped so as not to exceed the peak anode voltage of the valve 64, that is to say when the point 201 is at earth potential. Thus the predetermined value to which the voltage on the anode of the valve 64 is clamped when the waveform K causes the valve 68 to conduct, is the anode voltage of the valve 64 when the condenser 65 is totally discharged and the valve 68 is cut off. It will be realised that this is a random occurrence since at the end of each coding cycle there may be a small level, which will be less than one increment, stored by the condenser 65.

Assuming that the codes pulses have the significance, reading from left to right, of the magnitudes 128, 64, 32, 16, 8, 4, 2 and 1 respectively, the magnitude S represented by the pulse code appearing in the time interval $t_1$, and consisting of five pulses represents the numeral 213.

The pulses C are applied to the anode of the diode 45 and these prevent the diode 41 from conducting during the periods whilst the voltage at the point 201 is increasing in magnitude.

It will, of course, be understood that the coded pulses may take other forms, for instance finite significances may be given to the condition where there is no pulse and zero significance to the condition when a pulse is transmitted. In this case the magnitude S in curve F would be represented by pulses appearing in intervals 3, 5 and 7 instead of in intervals 1, 2, 4, 6 and 8 as shown. In order to obtain this result, it is only necessary to omit the valve 60 and apply the waveform H directly to the suppressor grid of the valve 61.

In another arrangement pulses of one sense or the other are transmitted in all the intervals, those in one sense having a finite significance and those in the opposite sense having zero significance. This may be done, for example, by combining with the waveform I a second waveform constituted by gating pulses of the form A by means of pulses at the form H in such a manner that the formed pulses are allowed to pass only during the positive-going pulses of the waveform H.

The present invention is not restricted to coding apparatus which makes use of a signal having the waveform E. Thus a stepped waveform may be produced by periodically supplying pulses to an integrating circuit and this waveform may be compared with the sample level S. When the stepped waveform has reached a level within one step, either above or below, of the level S, the supply of pulses to the integrator circuit then is interrupted and a pulse code signal transmitted defining the number of steps in the waveform up to that time. The difference between the appropriate step level and the level S is then amplified and compared in like manner with a second stepped waveform so as to produce a further pulse code signal defining that difference. The steps in each of these waveforms may all be equal.

I claim:

1. Apparatus for generating a pulse code signal representative of a voltage level with respect to a datum level, comprising means for repeatedly generating a pulse cycle comprising a first train of pulses of progressively decreasing amplitude followed at least by a second similar train of pulses of progressively decreasing amplitude, the ratio of the amplitude of each pulse in each train to the amplitude of the next preceding pulse in the same train being substantially constant and the length of each train being at most one half of the time between successive voltage levels to be coded, means for subtracting the peak voltages of successive pulses in said first train from a succession of voltage values to produce resultant voltages respectively, the first of said voltage values being the said voltage level and each of the remaining voltage values being that obtained in the nearest preceding subtraction in which the resultant voltage value is of the same sign as the said voltage level with respect to the datum level and in which a last resultant voltage remains after subtraction of the voltage corresponding to the final pulse of the train, means to amplify by a predetermined factor the difference between the last resultant voltage and the datum level and means for subtracting the peak voltages of successive pulses in said second train from a succession of voltage values to produce resultant voltages respectively, the first of said voltage values being the amplified last resultant voltage and each of the remaining voltage values being that obtained in the nearest preceding subtraction in which the resultant voltage is of the same sign as the amplified last resultant voltage with respect to the datum level and means for generating pulse signal elements which correspond one to each of the pulses in each pulse cycle and distinguish between those pulses in the pulse cycle which gave rise to resultant voltages of the same sign as the said voltage level and the amplified last resultant voltage with respect to the datum level and those which gave rise to resultant voltages of the opposite sign.

2. Apparatus according to claim 1 wherein the means for producing the trains of pulse of progressively decreasing amplitude comprises a damped tuned circuit which is arranged periodically to be shock-excited.

3. Apparatus according to claim 1 wherein the amplitude of successive pulses in each train produced by the said means for producing trains of progressively decreasing amplitude are in the ratio of 2 to 1.

4. Apparatus according to claim 1, wherein the first pulse of the first and second trains of pulses of progressively decreasing amplitude are the same amplitude.

5. Apparatus according to claim 1, wherein there are the same number of pulses in the first and second trains of progressively decreasing amplitude.

6. Apparatus according to claim 5 wherein the first pulse of the first and second trains of pulse of progressively decreasing amplitude are the same amplitude and the amplitude of successive pulses in each of these trains are in the ratio of 2 to 1.

7. Apparatus for generating a pulse code signal representative of a voltage level with respect to a datum level comprising first storage means for initially storing the voltage level, means for generating a signal comprising a first train of pulses of progressively decreasing amplitude followed by a second similar train of pulses of progressively decreasing amplitude, means for continuously subtracting the said signal from the level stored by the first storage means, sense determining means for determining whether the remainder of this subtraction is the same sign as, or the opposite sign to, the voltage level with respect to the datum level, second storage means for successively storing the levels obtained by subtracting the peaks of successive pulses of said signal from the level stored by the first storage means, means to reduce the level stored by the first storage means to each new level stored by the second storage means provided that the level stored by the second storage means is not the result of a subtraction, as determined by the sense determining means, which caused the said remainder to be the opposite side of the datum level to the voltage level, means for amplifying the level stored by the first storage means between the last pulse of the first train and the first pulse of the second train, and means for generating pulse signal elements which correspond one to each of the first-named pulses and distinguish between those first-named pulse which give rise to resultant voltages of the same sign as the voltage level with respect to the datum level and those which rise to resultant voltages of the opopsite sign.

8. Apparatus according to claim 7 wherein the first and second trains of pulses consist of the same number of pulses, the amplitude of each pulse in each train to the amplitude of the next preceding pulse in the same train is substantially constant and the amplitude of the first pulse of the second train is substantially equal to the amplitude of the first pulse of the first train.

9. Apparatus according to claim 8 wherein the amplitude of successive pulses in both the first and second trains are in the ratio of 2 to 1 and the said means for amplifying the level stored by the first storage means multiplies by a factor of $2^N$ the level stored by that storage means, where N is the number of pulses in each train.

10. Apparatus according to claim 9 wherein the first and second storage means are each a condenser.

11. Apparatus for producing an electric pulse code modulation signal in which the code pulses are representative of a characteristic of a signal which is to be transmitted comprising means for periodically sampling the said signal, a storage means, a connection between the sampling means and the storage means so that upon operation of the sampling means the storage means is arranged to store a level which represents the characteristic of the signal to be transmitted at the instant of sampling, coding means for producing an impulse code train, which represents the level stored by the storage means, means to reduce the level stored by the storage means to the difference between the level representing the sample and the level represented by the impulse code train, multiplying means to multiply the level stored by the storage means, and means to cause the coding means to produce a first impulse code train and to cause the level stored by the storage means to be reduced accordingly, then to cause the multiplying means to be operated to increase the level stored by the storage means, and then to cause the coding means to produce a second impulse code train which represent the said difference, the duration of the first and second impulse code trains being equal to or less than the time between successive samples to be coded.

12. Apparatus according to claim 11 wherein the characteristic of the signal to be transmitted is its amplitude.

13. Apparatus according to claim 11 wherein the storage means is a condenser.

MAURICE MOÏSE LEVY.

References Cited in the file of this patent

UNITED STATES PATENTS

| Number | Name | Date |
|---|---|---|
| 2,516,587 | Peterson | July 25, 1950 |
| 2,530,538 | Rack | Nov. 21, 1950 |
| 2,592,061 | Oxford | Apr. 8, 1952 |